May 20, 1952     M. CLEGG     2,597,291
TUMBLE CHURN

Filed March 30, 1950     2 SHEETS—SHEET 1

Inventor
Mark Clegg.
By Fishburn & Mullendore
Attorney

May 20, 1952  M. CLEGG  2,597,291
TUMBLE CHURN
Filed March 30, 1950  2 SHEETS—SHEET 2
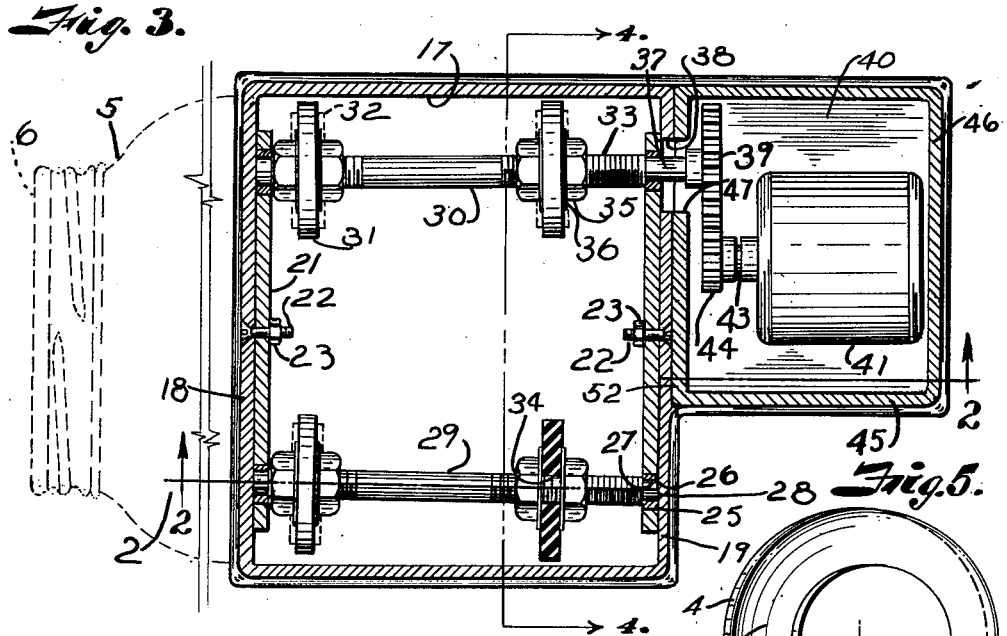
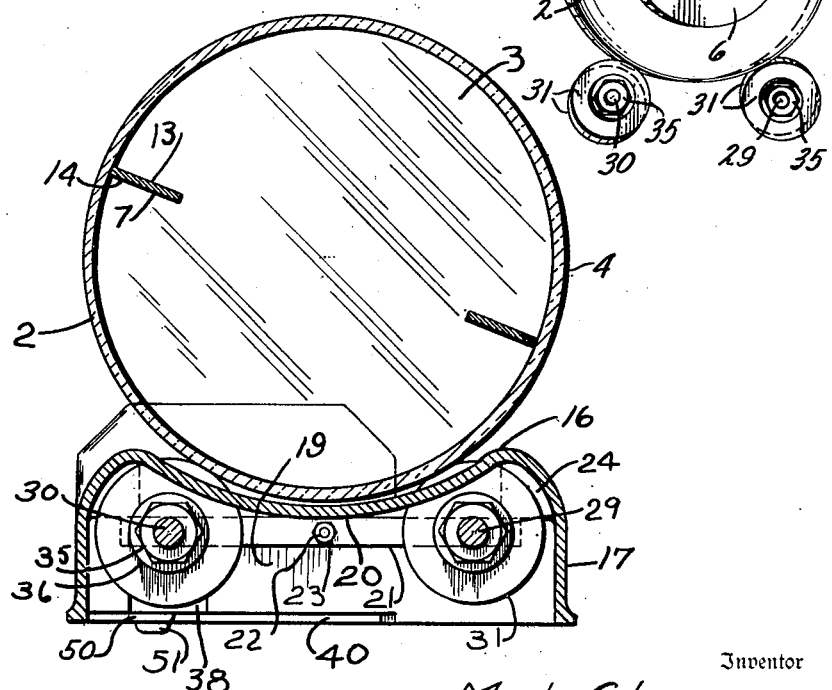
Inventor
Mark Clegg.
By Fishburn & Mullendore
Attorney Patented May 20, 1952

2,597,291

UNITED STATES PATENT OFFICE 2,597,291

TUMBLE CHURN

Mark Clegg, North Kansas City, Mo.

Application March 30, 1950, Serial No. 152,937

3 Claims. (Cl. 259—81)

This invention relates to containers and rotating apparatus therefor and more particularly to rotating mechanism with a container removably mounted thereon for purposes such as churning of milk into butter, tumbling, agitating and/or mixing of materials.

The objects of the invention are to provide a plurality of power driven rollers on wheels mounted in spaced relation and forming a cradle for removably supporting a container laid horizontally on said rollers and rotating said container for the accomplishment of the desired purpose; to provide an apparatus wherein a cylindrical container is rotated by frictional contact with rollers which form a cradle upon which the container rests when in horizontal position; to provide a transparent container which will permit observance of the mixing or churning of the materials in said container; to provide a roller arrangement which when rotating the container urges same endwise into engagement with a stop for limiting said endwise movement of the container, thereby retaining said container on the rollers; to provide a container with removable vanes for effecting agitation when the container is rotated, said vanes being frictionally held against rotation relative to said container; to provide a container and rotating apparatus therefor which eliminates any possibility of stalling of the drive mechanism regardless of the load or viscosity of the materials in the container; to provide a container that may be easily filled, emptied and cleaned to maintain same in a sanitary condition, there being no bearings, packing or movable members inside of the container; and to provide a compact structure which is economical to manufacture with an attractive appearance and efficient in operation for the churning of milk into butter or tumbling and mixing operations.

In accomplishing these and other objects of the present invention, I have provided improved details of structure, the preferred forms of which are illustrated in the accompanying drawings, wherein:

Fig. 3 is a horizontal sectional view through the wheel mountings and drive therefor on the line 3—3, Fig. 2.

Fig. 4 is a transverse sectional view through the container and rotating apparatus on the line 4—4, Fig. 3.

Fig. 5 is a diagrammatic view illustrating the tilted wheel carrying shafts and container supported thereon.

Figure 1:
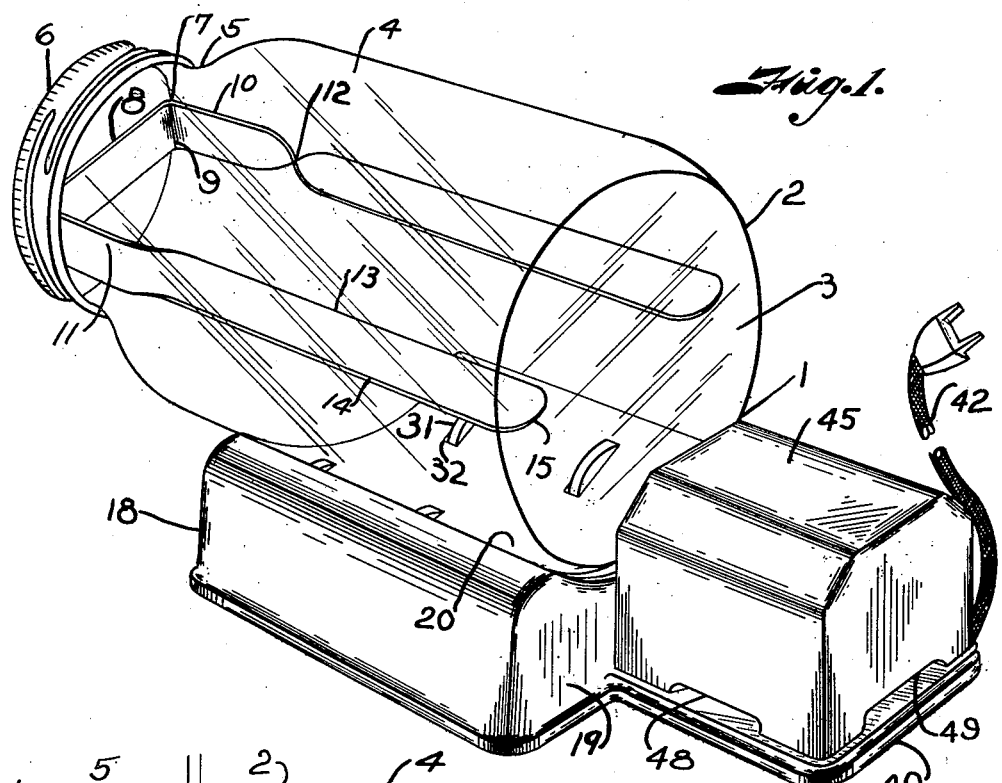
Fig. 1 is a perspective view of container and rotating apparatus therefor embodying the features of the present invention.
Figure 2:
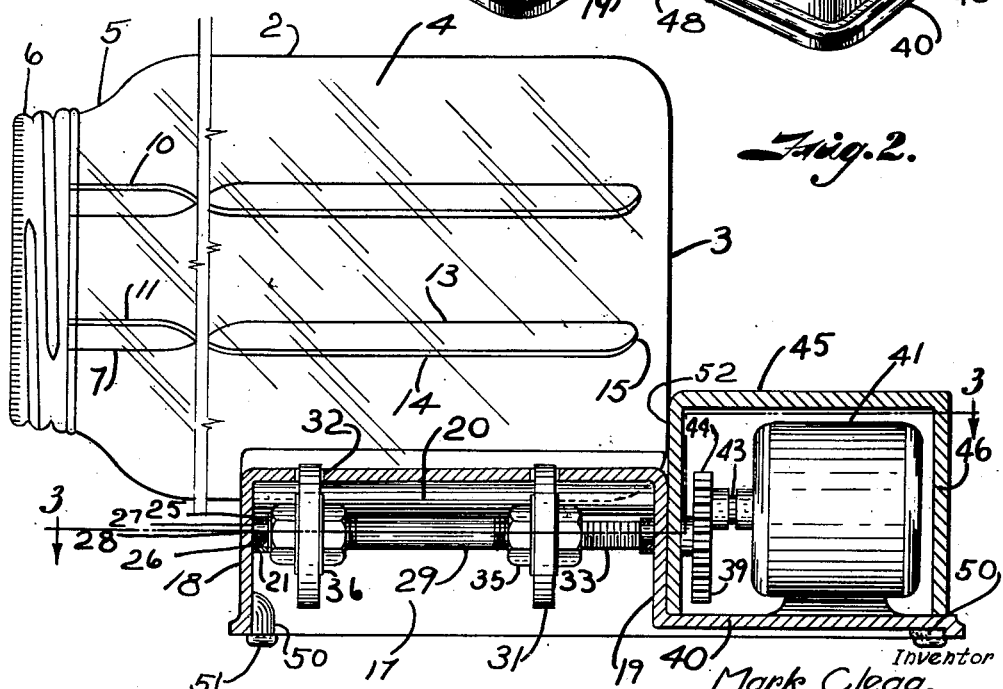
Fig. 2 is a longitudinal sectional view through the wheel mounting and housings on the lines 2—2, Fig. 3.

Referring more in detail to the drawings:

1 designates a container and rotating apparatus therefor which includes a hollow cylindrical container preferably of transparent material such as glass. The container has a bottom 3 and side walls 4, extending from the bottom, said side walls terminating in a neck 5 having external threads on which is screwed a cover 6 to close the opening in the end of the container, said opening preferably being relatively large to provide access to the interior of the container and facilitate cleaning thereof. Arranged on the inside of the container is an agitator structure 7 preferably formed of a metallic strip bent in a U-shape to provide a bar 8 substantially engaging the inner surface of the cap 6 and terminating in bends 9 to form parallel blades 10 and 11, which resiliently engage the inner surface of the neck 5. Each of the blades are preferably provided with a twist 12 adjacent to the neck of the container to form vanes 13 in planes radial to the axis of the container, said vanes having edges 14 engaging the inner surface of the walls 4 and terminal ends 15 engaging the inner surface of the bottom 3. The frictional engagement of the bar 8, blades 10 and 11, vane edges 14 and ends 15 with the various portions of the container hold the vane structure in the container and prevent relative rotation thereof. The resiliency of the material of which the agitator structure is formed allows the vanes to be pressed towards each other whereby upon removal of the cap the agitator structure may be withdrawn from the container, thereby permitting thorough cleaning and sterilizing of all of the container structure.

The mechanism for rotating the container in a horizontal position consists of a hollow base 16 having side walls 17 and end walls 18 and 19. The upper ends of the side and end walls connect with a longitudinally depressed or concave top wall 20. The curvature of the top wall 20 defines the trough cylindrical in shape with the axis thereof longitudinally of the housing. The radius of the curvature being greater than the outside radius of the container wall 4. Roller or wheel supporting bars 21 are secured on the inner face of the ends walls 18 and 19 by suitable means, such as bolts and nuts 22 and 23. The bars 21 extend in parallel relation transversely of the housing 16 and preferably engage the inner surface of the wall 20 and lower surfaces of lugs 24 adjacent to the side walls 17 for facilitating locating of the roller or wheel supporting bars. Each of the bars 21 are provided with transverse bores 25 adjacent the ends thereof, in which are mounted suitable bearings 26 such as bushings having bores 27 for rotatably mounting reduced ends 28 of shafts 29 and 30 which extend longitudinally of the housing 16. Rollers or wheels 31 formed of friction material such as rubber or the like are secured on the shafts 29 and 30. The wheels 31 are of such diameter and spacing and the shafts so located that said wheels extend partially through the top wall 20 of the base through slots 32 to form a cradle for the container 2, the side wall 4 of the container having engagement with the peripheries of the wheels 31 whereby the container is supported in spaced relation to the top wall 20. Each of the shafts 29 and 30 are preferably provided with threaded portions 33 and the wheels 31 are provided with bores 34 of suitable size for moving said wheels over the threaded portions 33 of the shafts.

Pairs of nuts 35 are threaded on the threaded portions 33 with the wheels 31 arranged between said nuts and washers 36 are preferably interposed between the wheels and the nuts to increase the bearing area. The nuts 35 are moved on the threaded portions 33 of the shafts until the wheels 31 are positioned in alignment with the slots 32. The nuts are then tightened to rigidly secure the wheels to the shafts 29 and 30. It is desirable that the shafts 29 and 30 and the wheels 31 thereon be so arranged that there is a tendency for the container 2 during rotation thereof to move longitudinally relative to the housing 16. This may be accomplished by having the wheels 31 of different diameters or by arranging the shafts whereby the axis of the container is slightly offset from parallel relation with the axis of said shafts. However, in the illustrated structure the wheels are the same diameter and the bars positioned so the bores of the bushing carrying the end 37 of the shaft 30 is higher than the bore carrying the corresponding end of the shaft 29 and the opposite ends of said shafts are reversely positioned whereby the end of shaft 29 adjacent the end wall 18 is higher than the corresponding end of shaft 30. The relative height of the lower surface of lugs 24 is such that when the bars 21 engage said lugs the shafts are tilted and the axis of the container skewed or offset from parallel relation with said shafts whereby the engagement of the wheels with the container tends to follow a helix thereon leading toward the covered end and urge the container toward the end wall 19.

The reduced portion of the shaft 30 at the end 37 thereof extends through a slot 38 in the end wall 19 of said housing and fixed on said end is a gear 39 which is positioned over a platform 40 that extends longitudinally from the end 19 of the housing and is preferably integral with said end wall 19. Suitably mounted on a platform is a motor 41 having electrical connection 42 adapted to be connected to a suitable source of current for energizing said motor and rotating the shaft 43 thereof. Fixed on the motor shaft is a gear 44 which meshes with the gear 39, whereby energization of the motor 41 drives the gear 39 and rotates the shaft 30 and wheels 31 thereon.

A housing 45 is suitably secured to the platform 40 whereby the walls 46 of said housing enclose the motor and gears 44 and 39 said housing having a slot 47 which aligns with the slot 38 whereby the housing may be applied and placed over the end of the shaft 30. The housing 45 has suitable apertures 48 and 49 for circulation of air in the housing around the motor 41. Suitable bosses 50 are arranged on the housing 16 and platform 40 and cushion members 51 suitably secured thereto for supporting the housing and platform on the surface and avoid marring of same. The housing 45 extends upwardly above the top wall 20 of the housing 16 whereby the end 52 of the housing 45 serves as a stop to limit longitudinal movement of the container 2. Obviously other stops may be arranged to cooperate with the particular arrangements of the shafts 29 and 30 and wheels 31 thereon which tends to move the container 2 during the rotation thereof longitudinally of the housing 16 against the stop thereby preventing the container from moving off of the cradle effect provided by the rollers 31.

In operating an apparatus constructed as described for churning milk into butter, the apparatus is placed on a relatively horizontal surface with the cushion members 51 in engagement therewith. The container 2 is removed from engagement with the wheels 31 and the cap 6 removed from the neck 5 of said container. The vane structure may be removed from the container whereby all of the parts of the container may be thoroughly sterilized. The container is then set up on a surface, resting on its bottom 3 and the agitators replaced in the container. Milk in condition to be churned is then placed into the container and the cap 6 screwed thereon to close same. The container with the milk therein is then placed on the wheels 31 whereby said wheels engage a cylindrical wall 4 of the container and form a cradle therefor with the bottom 3 of said container in engagement with the end 52 of the housing 45. The motor 41 is then connected by the electrical connection 42 with a suitable source of current whereby the motor is energized driving the gear 44 to effect rotation of the gear 39 on the shaft 30, thereby rotating the wheels 31 secured to the shaft 30. The weight of the container and milk therein provides sufficient friction between the container wall and the wheels 31 on the shaft 30 whereby the wheels rotate the container 2. Due to the fact that the vanes 13 are stationary in the container, here is a tumbling action and said tumbling will effectively churn the milk into butter as the container is rotated. The particular position and relationship of the wheels 31 and shafts 29 and 30 tend to move the container toward the motor housing 45 thereby retaining the bottom 3 of the container in engagement with the end wall 52 of the motor housing. This arrangement prevents the container from moving out of engagement with any of the wheels 31. The driving of one shaft is sufficient for rotation of the container regardless of the quantity of material in said container. It is impossible to stall the motor 41 as there will merely be slippage between the driving wheels 31 and the container in the event the friction therebetween is not sufficient to rotate the container at the same peripheral speed as the wheels. Therefore, the apparatus will operate efficiently whether the container is partly filled or completely filled. When the milk has been churned into butter, the container is merely lifted from the wheels 31 and set up on the bottom 3, the cap 6 removed, the agitator structure drawn from the container and then the butter may be removed in any convenient manner. Obviously, the entire structure may be thoroughly cleaned without difficulty.

The entire structure is such that it may be quickly disassembled and any parts replaced as there is easy access to every part of the structure. For example, the motor housing can be removed and then by removing the gear 39 from the shaft 30 and removing each of the screws and nuts 22 and 23, the wheel assembly may be removed from the housing 16. It is therefore believed obvious that I have provided apparatus that is easy to maintain and efficient in operation for churning milk into butter or tumbling, mixing or other treatment of materials.

What I claim and desire to secure by Letters Patent is:

1. Apparatus for tumbling material contained in a cylindrical container comprising, a base, a pair of laterally spaced wheel carrying shafts carried by the base to engage and support the cylindrical container, means adjacent one end of the shafts and fixed relative to the base forming an abutment for limiting endwise movement of the cylindrical container toward the abutment, and means rotating one of the shafts to effect rotation of the cylindrical container, one of said shafts being tilted relative to the other whereby the longitudinal axis of the cylindrical container supported thereby is skewed relative to the axes of the shafts and rotation of the roller carrying shafts and engagement thereof with the cylindrical container urges endwise movement of said container toward the abutment.

2. Apparatus for tumbling material contained in a cylindrical container comprising, a hollow base having spaced slots in the top thereof, means at one end of the base forming an abutment extending above the top of the base, a plurality of laterally spaced shafts rotatably mounted within said hollow base and extending substantially longitudinally thereof, a plurality of wheels mounted on each of the shafts and spaced longitudinally thereof, said wheels extending through the slots in the top of the base to form a cradle and engage and support a cylindrical container in substantially horizontal position, and means for rotating one of the wheels for effecting rotation of the cylindrical container, one of said shafts being tilted relative to the other whereby the longitudinal axis of the cylindrical container supported thereby is skewed relative to the axes of the shafts and rotation of the wheels and engagement thereof with the cylindrical container tends to effect endwise movement of said container toward the abutment.

3. Apparatus for tumbling material contained in a cylindrical container comprising, a hollow base having spaced slots in the top thereof, means at one end of the base forming an abutment extending above the top of the base, a plurality of laterally spaced shafts rotatably mounted within said hollow base and extending substantially longitudinally thereof, a plurality of wheels rigidly mounted on each of the shafts and spaced longitudinally thereof, said wheels extending through the slots in the top of the base to form a cradle to engage and support a cylindrical container in substantially horizontal position, and means for rotating one of the shafts for effecting rotation of the cylindrical container, said shafts being oppositely tilted relative to the horizontal whereby the longitudinal axis of the cylindrical container supported on the wheels is skewed relative to the axes of the shafts and rotation of the shafts and engagement of the wheels thereon with the cylindrical container tends to effect endwise movement of said container toward the abutment.

MARK CLEGG.

REFERENCES CITED

The following references are of record in the file of this patent:

UNITED STATES PATENTS

| Number | Name | Date |
|---|---|---|
| 1,788,901 | Wilson | Jan. 13, 1931 |
| 1,940,492 | Gale | Dec. 19, 1933 |
| 2,041,318 | Berger | May 19, 1936 |
| 2,322,189 | Cole | June 15, 1943 |
| 2,510,858 | Black | June 6, 1950 |